US006568348B1

(12) United States Patent
Bédard

(10) Patent No.: US 6,568,348 B1
(45) Date of Patent: May 27, 2003

(54) SELF-CLEANING CIRCULAR LITTER DEVICE

(76) Inventor: Jacques Normand Bédard, 48 Kenmare Place, Nepean, Ontario (CA), K2J-3L9

( * ) Notice: Subject to any disclaimer, the term of this patent is extended or adjusted under 35 U.S.C. 154(b) by 0 days.

(21) Appl. No.: 09/731,034

(22) Filed: Dec. 7, 2000

Related U.S. Application Data

(60) Provisional application No. 60/169,938, filed on Dec. 10, 1999.

(51) Int. Cl.[7] ............................................. A01K 29/00
(52) U.S. Cl. ...................................................... 119/166
(58) Field of Search ................................. 119/163, 165, 119/166–168

(56) References Cited

U.S. PATENT DOCUMENTS

| | | | | |
|---|---|---|---|---|
| 4,574,735 A | * | 3/1986 | Hohenstein | 119/166 |
| 5,226,388 A | * | 7/1993 | McDaniel | 119/166 |
| 5,931,119 A | * | 8/1999 | Nissim et al. | 119/163 |
| 6,234,112 B1 | * | 5/2001 | Emery | 119/166 |
| 6,286,459 B1 | * | 9/2001 | Parr | 119/166 |

* cited by examiner

Primary Examiner—Thomas Price

(57) ABSTRACT

A self-cleaning litter device for animals that extracts waste from litter material contained in a substantially circular chamber. Sifting of the litter is produced by a rotational motion between a rake and the chamber and may be performed by rotating the rake or the chamber. Solid waste is pushed outwards, towards the outer perimeter of the chamber, for removal. A device is provided to prevent the solid waste from smearing against the side wall of the chamber before being removed. A waste receptacle, with a trapdoor to suppress odors, operates independently of the raking device. The rake may be comprised of helically-shaped tines to reduce drag in the litter. Embodiments are described for indoor and outdoor use; and for clumping and nonabsorbent litter.

16 Claims, 10 Drawing Sheets

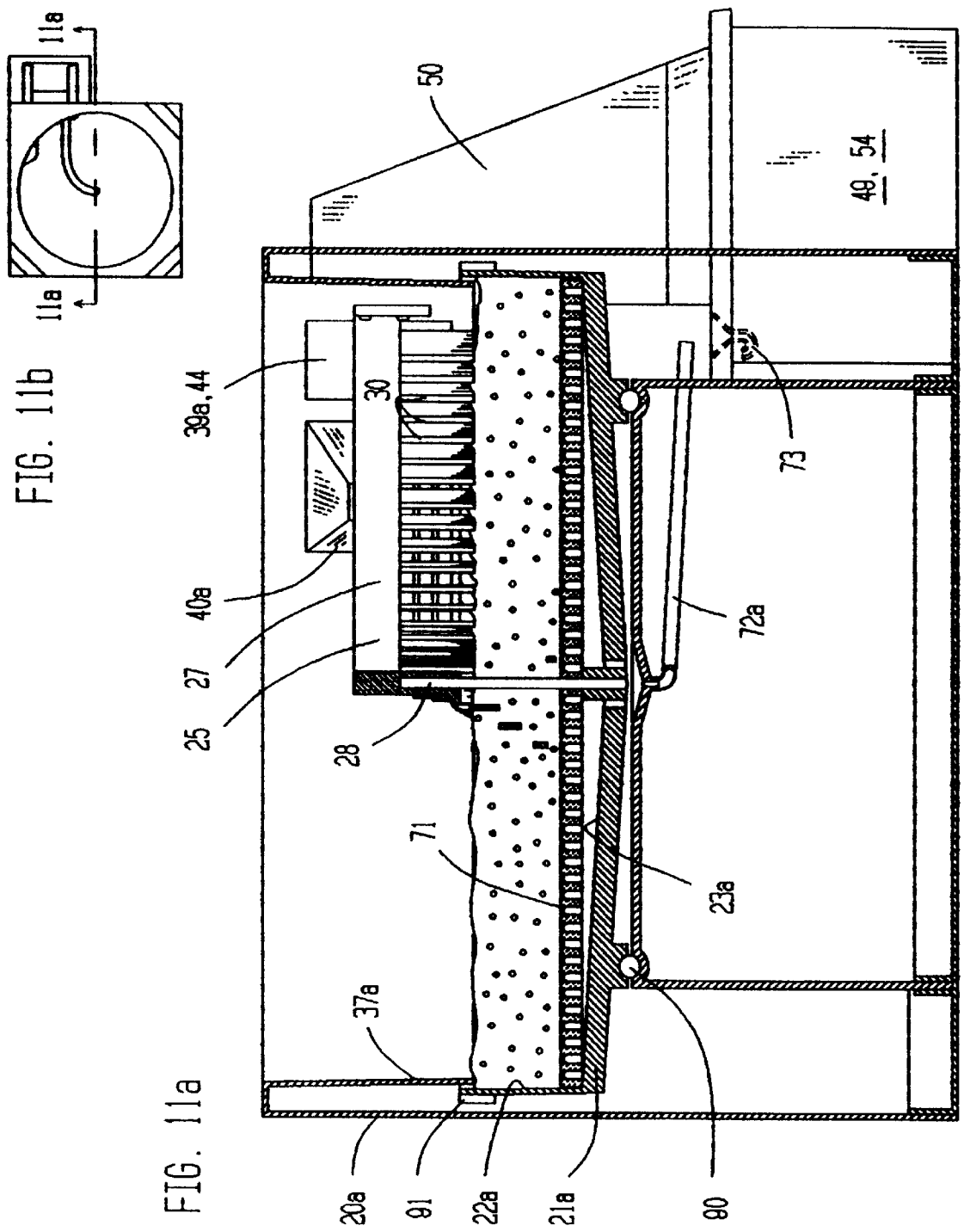

SELF-CLEANING CIRCULAR LITTER DEVICE

CROSS-REFERENCE TO RELATED APPLICATIONS

This application claims the benefit of Ser. No. 60/169,938, filed Dec. 10, 1999.

FEDERALLY SPONSORED RESEARCH OR DEVELOPMENT

Not Applicable

BACKGROUND OF THE INVENTION

The present invention relates to a self-cleaning sanitary device for animals. The invention also relates to indoor and outdoor self-cleaning sanitary devices.

Many forms of sanitary devices have been developed to collect bodily waste from animals. The most common of these are litter boxes used by household pets, such as cats and dogs. Although litter boxes are generally accepted by animals, regular daily disposal of the solid waste is recommended. Lack of regular cleaning can produce odors and force the animals to navigate around, or unintentionally dig up, waste from previous days. This can encourage the animals to find less-disagreeable places to relieve themselves and weaken their "toilet training". Similarly, releasing animals outdoors to relieve themselves can result in poor "toilet habits" that can become a source of aggravation and conflict with other users of the area, such as neighbors and passers-by. Clearly, a self-cleaning litter device is desirable to eliminate the disagreeable and often avoided task of manually cleaning litter.

The recent introduction and widespread availability of clumping litter has influenced the design of many self-cleaning litter devices. Clumping litter reacts with liquid waste (urine) to form solid clumps. The solid clumps can be collected in the same way as other solid waste (feces) to provide a cleaner litter area. Sufficient litter depth, however, is required to prevent the clumping litter from solidifying against, and bonding to, the bottom of the litter box.

Many self-cleaning litter devices are motorized and automated to operate unattended for extended periods. Solid waste is extracted from the litter and stored in a waste receptacle. A means is generally provided to reduce or prevent excessive odors from escaping the waste receptacle. The automated versions have short cleaning cycles (generally less than a few minutes) that are activated after a suitable time delay to allow the clumping litter to react. Short cleaning cycles however can produce fast, unexpected movements and motor noise that can easily scare the animals or increase their discomfort during use. The automated versions therefore use sensors and start/stop controls to detect if animals have used the devices and to avoid operating the cleaning cycles while animals are in the devices. Sensors and controls however increase the complexity and cost of the devices. A few of the more relevant self-cleaning litter designs are briefly described below.

Motorized self-cleaning litter devices using rectangular chambers (similar to the common litter box) are disclosed in, for example, U.S. Pat. No. 5,226,388, U.S. Pat. No. 5,477,812 and U.S. Pat. No. 5,544,620. Rake motion includes a forward stroke to extract solid waste from the litter; an upward stroke to lift the waste over the enclosing wall and dump it in a waste receptacle; and a backward stroke to smooth the litter and return the rake to its "parked" position. A disadvantage with these devices is litter buildup at the ends of the chamber due to the forward and backward strokes of the rake. This can interfere with proper rake operation and lead to reduced litter depth near the center of the chamber. Burying habits of the animals can further upset the litter distribution and can make extended periods of unattended operation problematic. In addition, waste deposited on the wrong side of the rake (e.g., during an interrupted cleaning cycle) is pushed to the rake's "parked" position during the backward stroke and must be manually removed.

Cylindrical self-cleaning litter devices using horizontally-positioned drums have been disclosed in, for example, U.S. Pat. No. 4,120,264, U.S. Pat. No. 5,048,464 and U.S. Pat. No. 5,509,379. Generally, these devices include a rake attached to the inner surface of the drum which sifts the litter during drum rotation. The cylindrical wall of the drum supports the litter and rises out of both sides of the litter area at an angle. Litter depth varies from a maximum near the center of the litter area to zero depth along the sides. Minimal litter depth along these sides can easily result in exposure of the cylindrical wall surface to liquid waste. This can cause clumping litter to adhere to the cylindrical wall surface and must be cleaned manually.

A self-cleaning litter device is described in U.S. Pat. No. 4,574,735 comprising a bowl-shaped, circular litter chamber. The device uses a stiff first rake, with horizontal tines extending in a curved or spiral shape from a spindle along the central axis of the chamber, to urge solid waste to the outer perimeter of the chamber during rake rotation. A flexible second rake then pushes the solid waste up a bordered ramp along the outer perimeter of the chamber into an opening that leads to a waste receptacle. Both rakes are driven by the spindle and quickly circle the chamber in 6 to 30 seconds. A disadvantage with this design however, is that the curvature of the stiff rake can also push solid waste against the border of the ramp. Solid waste can become trapped and smeared into the rake and along the border of the ramp which must be cleaned manually; or can break apart producing smaller pieces that may not be collected by the rakes. The side wall of the chamber can also become smeared with solid waste during contact to deflect the solid waste into a circular path. The means to remove solid waste from the chamber relies on contact with the floor of the ramp to deflect the flexible rake out of the litter. Over time, severe wear of the rake and the ramp can result due to the abrasive nature of most litters. In addition, the centrally-based drive system, while capable of meeting the demands of the rakes and accommodating the described means to remove solid waste from the chamber, inherently requires strong components and a strong support structure to transmit the forces needed at the outer ends of the cantilever-based rakes.

U.S. Pat. No. 5,931,119 discloses a self-cleaning litter device wherein a circular pan rotates past a rake during the cleaning cycle. The rake is normally vertical, outside the pan, and cantilevers into the pan to sift the litter. After sifting, the rake is rotated (to scoop the sifted waste) and cantilevered out of the litter pan. The solid waste eventually rolls down the rake (as it is cantilevered up) to fall into a waste receptacle. Drive mechanisms are required for both the pan and the rake. The means to cantilever and rotate the rake requires strong, accurate components and a strong support structure to sustain the forces produced during the sifting action and prevent the rake tines from scraping the bottom of the circular pan. In addition, the open waste receptacle cannot prevent the solid waste, now exposed to the air, from releasing odors back into the pan area and escaping the device. This requires frequent emptying of the waste receptacle and significantly reduces the period of unattended operation.

Many automated self-cleaning sanitary devices have unique and complicated approaches to reducing or preventing the escape of odors from the waste receptacle. U.S. Pat. No. 4,574,735 describes a rotating waste receptacle that mixes the waste with sanitizing and deodorizing chemicals. U.S. Pat. No. 5,477,812, U.S. Pat. No. 5,544,620, and U.S. Pat. No. 5,107,797 describe devices that combine a means to open and close a lid on the waste receptacle with the means to move the rake through the litter. U.S. Pat. No. 5,048,464 describes a rocking lid on a waste receptacle that tilts open by the weight of the solid waste. Because solid waste can be light in weight, the rocking lid design must be well balanced. In addition, the rocking lid design requires a gap around the perimeter of the lid to prevent jamming. The gap, however, can also allow odors to escape. Further, the rocking lid opens inward, into the waste receptacle, which reduces its maximum capacity.

Although a wide variety of designs exist for self-cleaning sanitary devices in general and self-cleaning litter devices in particular, many have drawbacks which limit their benefits or significantly increase their cost. A need exists for a simple self-cleaning litter device that reduces manual involvement in the disagreeable tasks of maintaining a clean litter area. There is also a long felt need for an automatically self-cleaning litter device that can operate unattended for extended periods to provide a clean litter area for animals and is available at reasonable cost. There is also a need for similar devices used outdoors.

The present invention sets out to obviate the problems identified within the prior art self-cleaning sanitary devices and to meet the needs described above.

BRIEF SUMMARY OF THE INVENTION

The present invention relates to a self-cleaning sanitary device for animals. The invention also relates to indoor and outdoor self-cleaning sanitary devices.

According to the present invention there is provided a self-cleaning liner device that extracts solid waste from a litter material contained therein during use, comprising,
  a substantially circular chamber bounded by a side wall;
  a rake;
  a means to produce a rotational motion between the rake and the chamber;
  a means to prevent the rake from pushing the solid waste against the side wall of the chamber; and
  a means to remove the solid waste collected by the rake from the chamber.

Preferably, the rake extends from a central axis of the chamber to an outer end near to the side wall of the chamber, and comprises a plurality of tines. The tines may extend with generally downward slopes into the chamber to deflect solid waste upwards. Furthermore, one or more tines may be helically-shaped with each tine curved with a radius of curvature about equal to its radial distance from the central axis of the chamber. This invention also pertains to the self-cleaning litter device as defined above with the rake also comprised of at least one deflector.

This invention also considers the self-cleaning litter device as defined above wherein the means to produce the rotational motion between the rake and the chamber comprises a drive means in operative association with a substantially circular sleeve adjacent the side wall of the chamber causing the sleeve to rotate; the sleeve being attached to the outer end of the rake causing the rake to rotate. Alternatively, the means to produce the rotational motion between the rake and the chamber comprises a drive means in operative association with the chamber causing the chamber to rotate. The invention also considers the self-cleaning litter device as defined above wherein the means to produce a rotational motion between the rake and the chamber may be applied near the side wall of the chamber. The invention also pertains to the self-cleaning litter device as defined above wherein the drive means may be selected from a group consisting of a motor, a wind turbine and a hand crank.

This invention also includes the self-cleaning litter device as defined above, wherein the means to prevent the rake from pushing solid waste against the side wall of the chamber comprises at least one tine nearest the outer end of the rake positioned in advance of adjacent inner tines so that contact between the solid waste and the tines nearest the outer end of the rake does not direct solid waste outwards. This invention also pertains to the self-cleaning litter device as defined above also comprising a platform attached to the outer end of the rake.

This invention is also directed to the self-cleaning litter device as defined above wherein the means to remove the solid waste from the chamber, collected by the rotating rake and sleeve, comprises;
  a tunnel in the side wall of the chamber; and
  the sleeve having an opening, immediately adjacent the rake, so that when the opening in the sleeve aligns with the tunnel, the solid waste is removed from the chamber.

This invention also pertains to the self-cleaning litter device as defined above also comprising a scoop positioned in the tunnel and forced into the chamber by a biasing means, when the opening in the sleeve aligns with the tunnel, to deflect the solid waste into the tunnel before being forced back into the tunnel.

This invention also pertains to the self-cleaning litter device as defined above, wherein the rotational motion between the rake and the chamber may occur at a speed less than 10 cm per minute. Preferably, the rake to chamber rotational motion is continuous, however, the self-cleaning litter device may be operated intermittently and may be comprised of a timer or sensors/controls to detect an animal and control the means to produce the rotational motion.

The invention also pertains to the self-cleaning litter device as defined above further comprising a means to drain liquid waste from the chamber.

According to a further aspect of the present invention there is provided a waste receptacle for use with a self-cleaning sanitary device to collect solid waste comprising,
  a container;
  a cover that fits over the container and further comprises;
    a tilted frame around an opening; and
    a trapdoor covering the opening that is sufficiently light in weight to be pushed open by the solid waste and closed by gravity to rest on the tilted frame.

Preferably the trapdoor can flex under its own weight to conform to the surface of the tilted frame to reduce odors. The invention also pertains to the waste receptacle as defined above also comprising a ramp in front of the trapdoor to assist the solid waste in pushing the trapdoor open.

According to a further aspect of the present invention there is provided a rake to extract solid waste from a substantially circular chamber of a self-cleaning litter device comprising a plurality of tines that extend with generally downward slopes into the chamber to deflect or push solid waste upwards and wherein one or more tines may be helically-shaped with each tine curved with a radius of curvature about equal to its radial distance to the central axis of the circular chamber. This invention also pertains to the rake as defined above also comprised of at least one deflector.

Advantages associated with the self-cleaning litter device of the present invention include the capacity to prevent the rake from pushing solid waste against the side wall of the chamber before being removed from the chamber. A further advantage is the capacity to produce sifting of the litter contained in the chamber by rotating the rake or the chamber. A further advantage is the capacity to produce a rotational motion between the rake and the chamber by pushing the outer end of the rake or the side wall of the chamber while simultaneously providing a means to remove solid waste collected by the rake from the chamber. A still further advantageous aspect of the invention is the capacity to use helically-shaped tines on the rake to reduce the amount of litter disturbed during sifting and the force required to sift the litter. Another advantageous aspect of the invention is the capacity to use deflectors on the rake to redistribute litter within the chamber. Another advantageous aspect of the invention is the capacity to use a slow rotational motion between the rake and the chamber that permits continuous sifting of the litter even while an animal is in the device and eliminates the need for control circuitry, however, such circuitry may be employed if desired. Another advantageous aspect of the invention is the capacity to use a wind-powered drive means to produce an outdoor self-cleaning litter device that is independent of electrical power. A further advantageous aspect of the invention is the capacity to provide a means for draining liquid waste from the chamber to operate with nonabsorbent litter. A further advantageous aspect of the invention is an odor-suppressing waste receptacle with a trapdoor that operates independently of the means to extract waste from the litter.

This summary of the invention may not describe all the embodiments or features of the invention and in no way implies and should in no way be construed that the invention is limited to the described embodiments and combinations of features but that other embodiments, variations, features, combinations or sub-combinations of features may also apply.

BRIEF DESCRIPTION OF THE DRAWINGS

These and other features of the invention will become more apparent from the following description in which reference is made to the appended drawings wherein:

FIG. 7a is a sectional front elevation view of an aspect of an embodiment of the present invention with a means for draining liquid waste from a stationary chamber.

FIG. 7b is a reference plan view showing the location of the sectional front elevation view of FIG. 7a.

FIG 11a is a sectional front elevation view of an aspect of an embodiment of the present invention with a means for draining liquid waste from a rotating chamber.

FIG 11b is a reference plan view showing the location of the sectional front elevation view of FIG. 11a.

DESCRIPTION OF PREFERRED EMBODIMENT

The present invention relates to a self-cleaning sanitary device for animals. The invention also relates to indoor and outdoor self-cleaning sanitary devices.

The following description is of preferred embodiments of the invention by way of example only and in no way implies and should in no way be construed that the invention is limited to the described embodiments and combinations of features but that other embodiments, variations, features and combinations of features are included within the scope of the claims.

Figure 1:
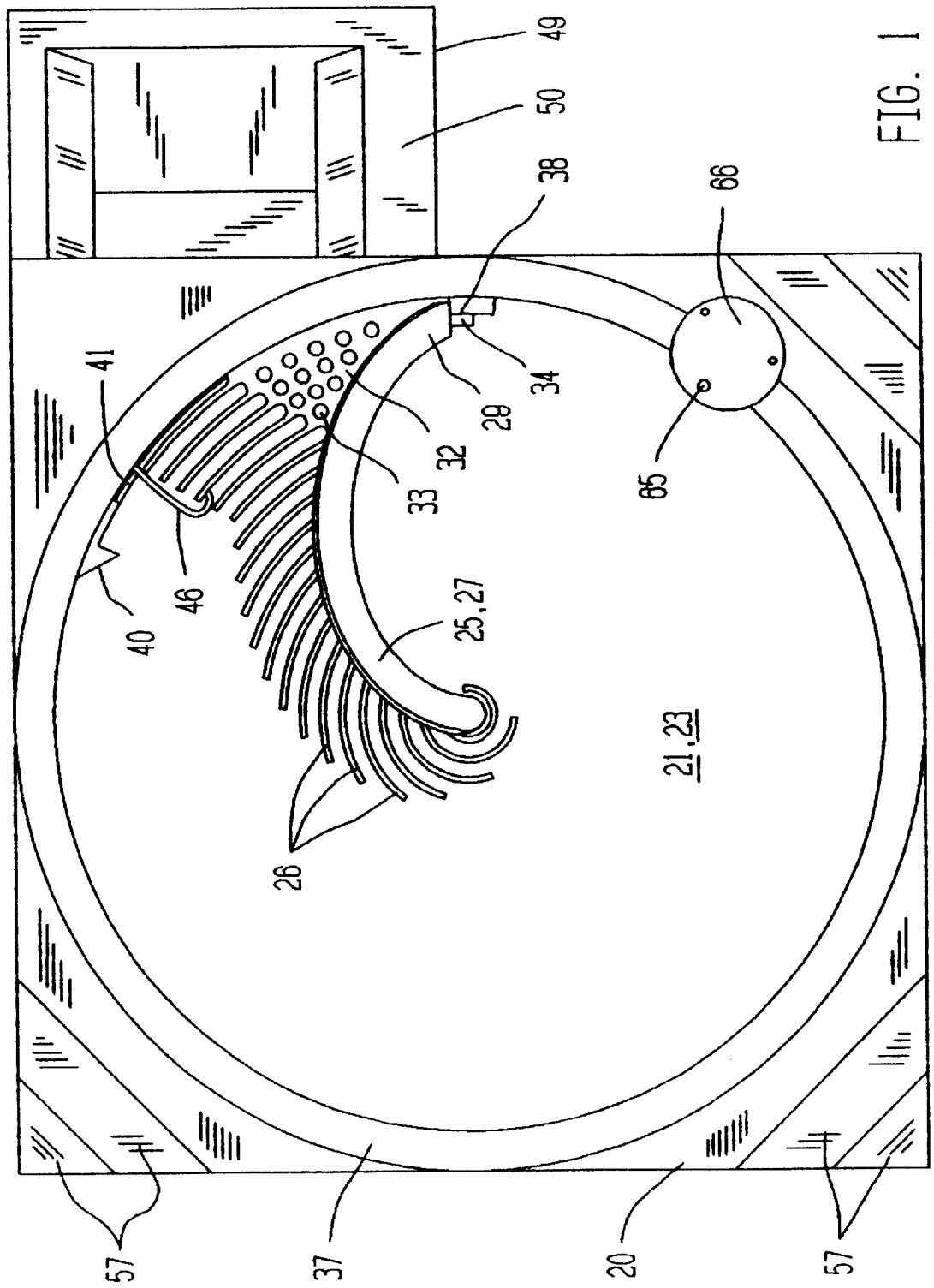
FIG. 1 is a plan view of an aspect of an embodiment of the present invention.
Figure 2:
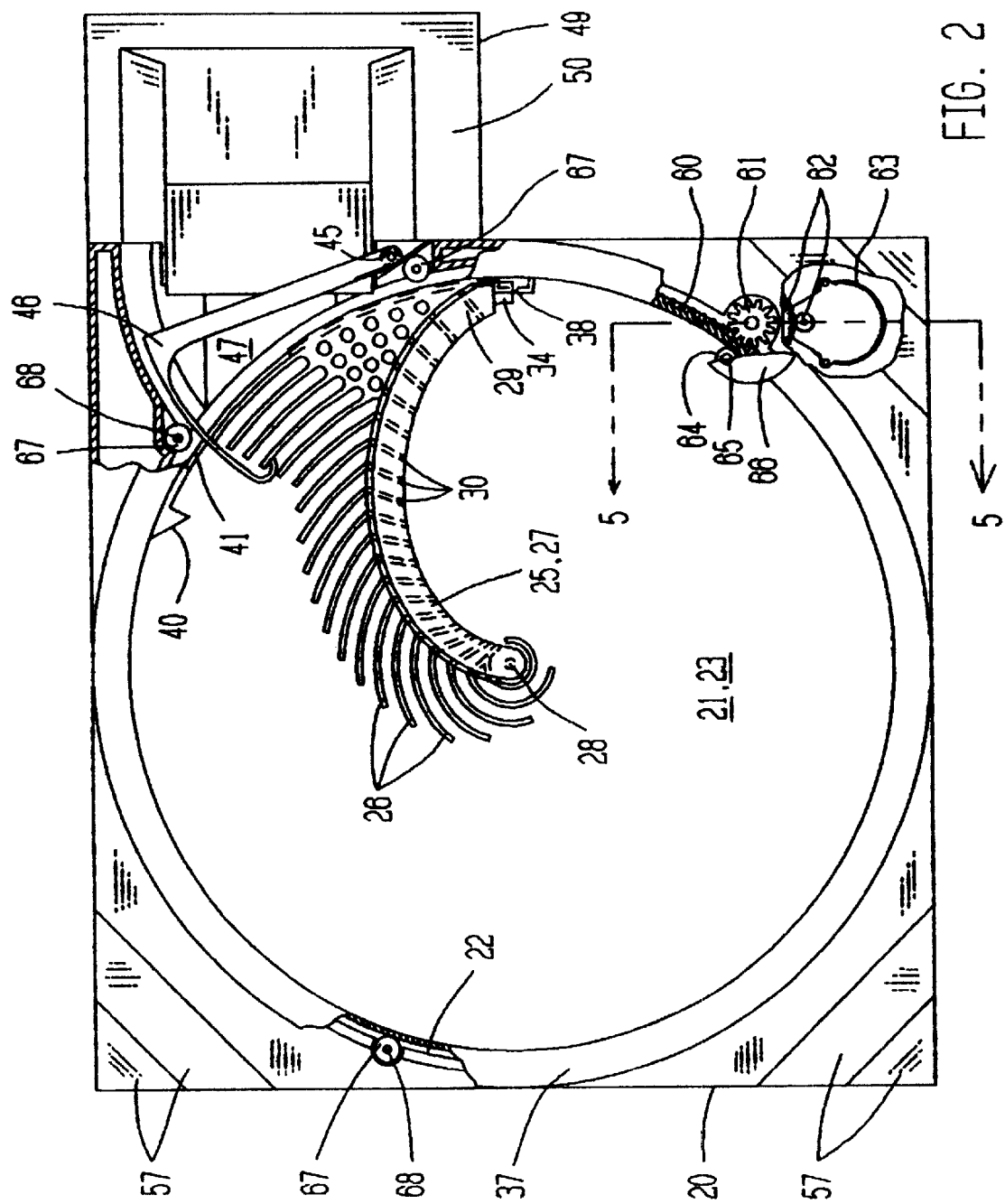
FIG. 2 is a plan view of an aspect of the embodiment of the present invention shown in FIG. 1 with cutout sections to highlight hidden features.

With reference to FIG. 1 and FIG. 2, there is disclosed a self-cleaning litter device that comprises a substantially circular chamber 21 in which a rake (generally indicated as 25) extracts solid waste from a litter material contained therein during use. The rake 25, comprising a support arm 27 and tines 26, extends in a curved or spiral fashion from a post 28 (FIG. 2) located approximately along the central axis of the chamber 21 to an outer end 29 near the side wall 22 of the chamber.

Figure 9:
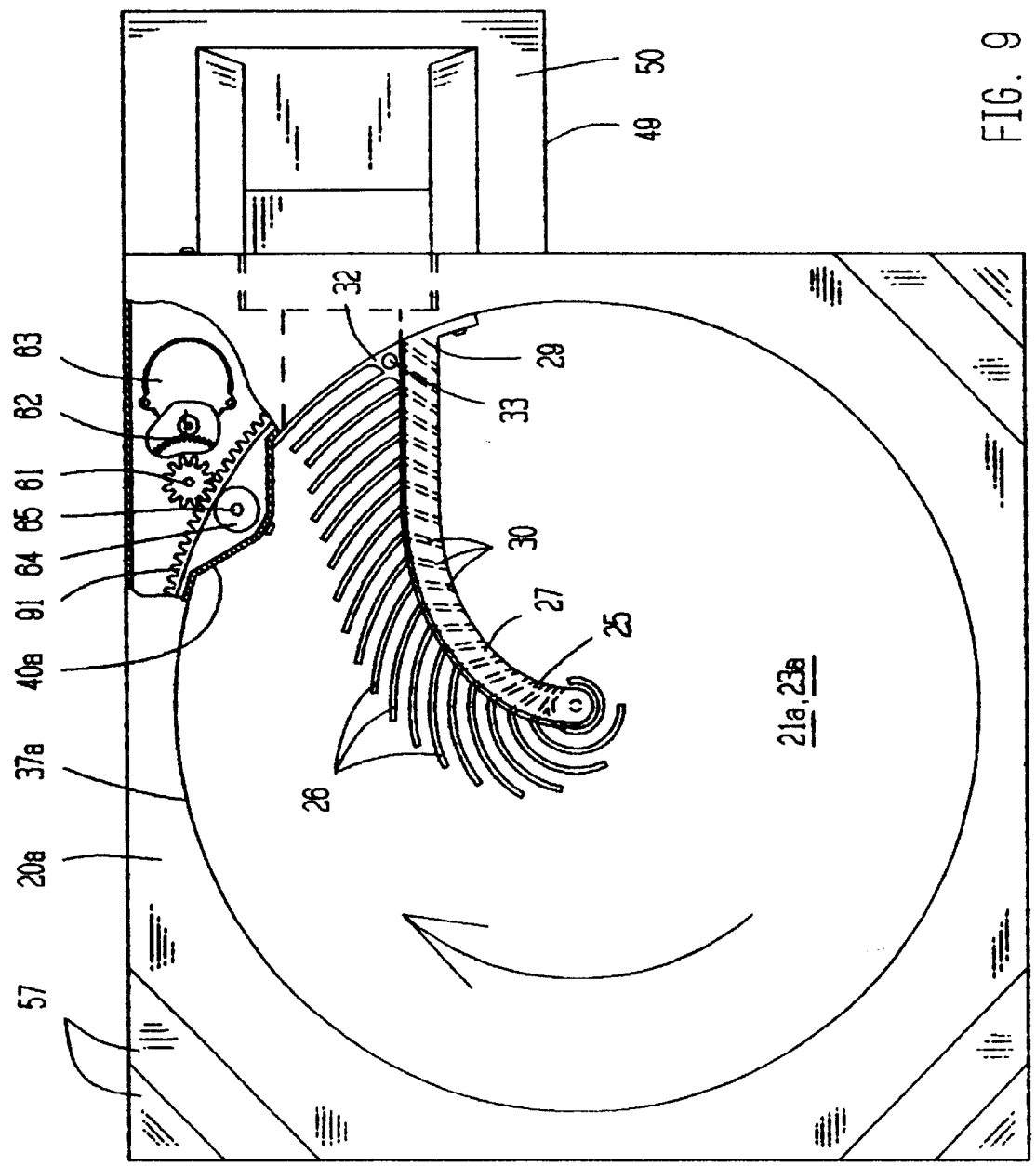
FIG. 9 is a plan view of an aspect of an embodiment of the present invention using a stationary rake and a rotating circular chamber.
Figure 10:
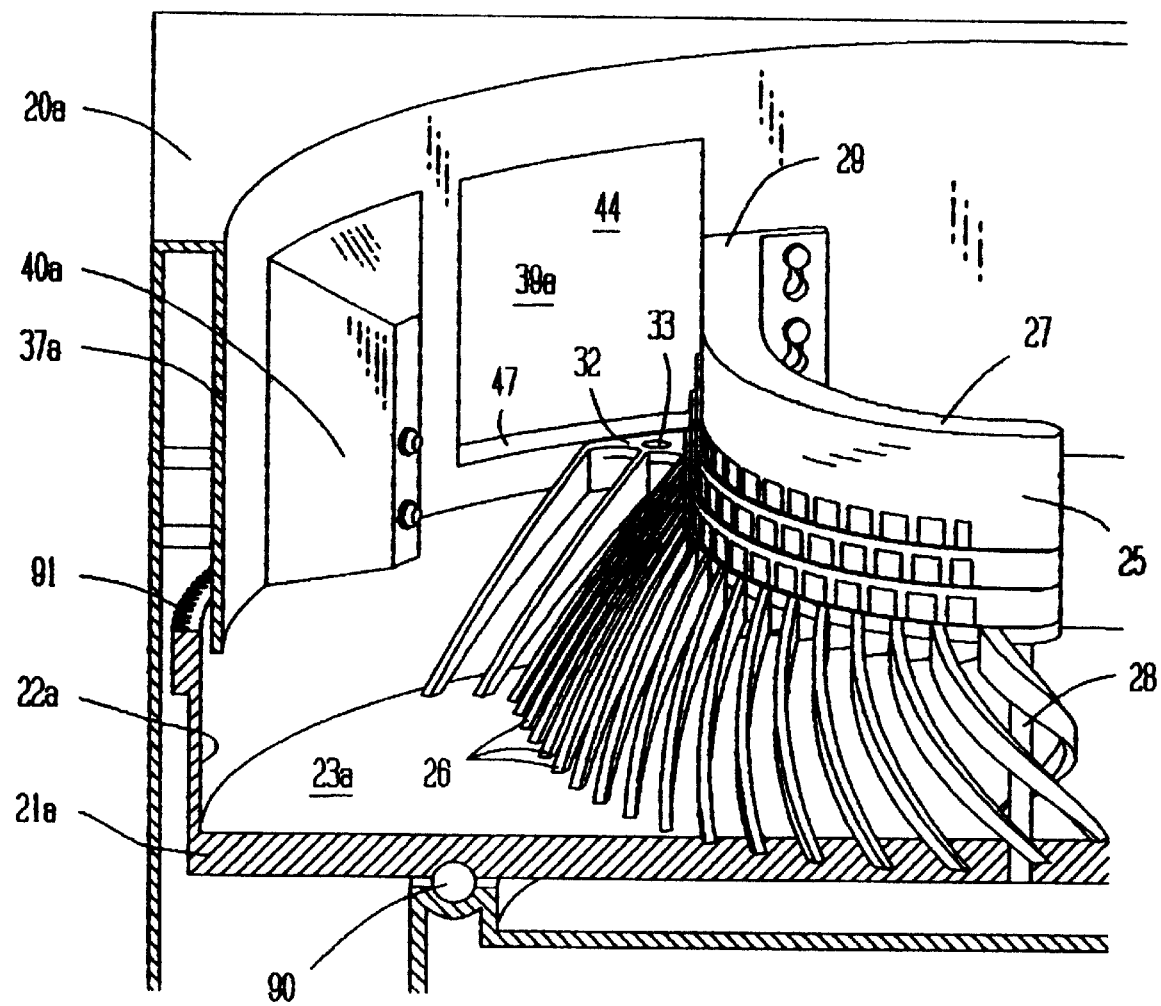
FIG. 10 is a perspective view of an aspect of the embodiment of the present invention shown in FIG. 9, showing the relationship between the rake, tines, platform and tunnel.

Sifting of the litter is achieved by moving the rake 25 through the litter or by moving the litter past the rake and may be achieved by a rotational motion between the rake and the chamber 21. Means to produce the rotational motion includes for example, rotating the rake 25 within a stationary chamber 21 as shown in FIG. 1 and FIG. 2, or rotating chamber 21a past a stationary rake 25 as shown in FIG. 9 and FIG. 10. Rotation of the rake 25 may be achieved, for example which is not to be considered limiting, by driving the rake from post 28 or from its outer end 29. Driving the rake by its outer end 29 may be achieved, for example which is not to be considered limiting, by a drive means which travels with the rake and acts on a traction means along the side wall of the chamber or by rotating a substantially circular sleeve 37 near the side wall 22 of the chamber 21 which is attached to and pushes the outer end 29 of the rake. However, other means may also be used. In the embodiment where the rotating sleeve 37 pushes the outer end 29 of the rake 25, the sleeve may be operatively associated with any suitable drive means, for example but not limited to, a motor such as an electric geared motor 63 (FIG. 2), a wind turbine 83 (FIG. 8), or a hand crank (not shown) through any suitable traction means such as a sleeve gear 60 around the outside surface of the sleeve 37 and a pinion 61. Other traction means may also be employed, for example a belt drive or a capstan rotor in driving association with the outer surface of sleeve 37. To assist in the rotational motion, the sleeve 37 shown in FIG. 2 may interact with one or more idler rollers 67 positioned along the side wall 22 of the chamber 21. A restraining means (for example, 64) is also provided to ensure that the sleeve gear 60 and pinion 61 remain meshed.

The rake has a plurality of tines 26. The tines 26 may be of any suitable shape that can extract or sift solid waste from the litter such that their distribution along the rake and the curved shape of the rake urges the solid waste outwards (towards the side wall of the chamber) until the solid waste approaches the outer end 29 of the rake 25. For example, which is not to be considered limiting in any manner, one or more tines 26 may be helically-shaped, extending with generally downward slopes into the chamber to deflect buried solid waste upwards to the surface of the litter, and each helically-shaped tine curved with a radius of curvature about equal to its radial distance from the central axis of the circular chamber 21 as shown in FIG. 1. One or more deflectors (30, shown in FIG. 2, FIG. 3a and FIG. 3b) may be used to deflect or redistribute litter disturbances caused by animal activity and/or rake/tine sifting action, however, the use of deflectors may be optional. The tines and deflectors may be independently connected to the rake support arm 27 or they may be combined such that, for example, the tines 26 may be linked to the rake support arm 27 by deflectors 30. The deflectors 30 shown in FIG. 2, FIG. 3a and FIG. 3b extend down from the rake support arm 27 to a level near the recommended litter level to redirect surface litter within their reach.

The curved shape of the rake 25 and the distribution of the tines 26 causes sifted solid waste to be pushed outwards towards the side wall 22 of the chamber 21 until the solid waste approaches the outer end 29 of the rake. Means to prevent the solid waste from being pushed against the side wall 22 of the chamber 21 may include, for example, one or more tines nearest the outer end 29 of the rake 25 positioned in advance of adjacent inner tines to alter the general distribution of tines along the rake so that contact between solid waste and the tines nearest the outer end of the rake does not direct solid waste outwards (FIG 1). A platform 32 may also be incorporated between the advanced tines and the rake support arm/cross members/deflectors (27, 31, and 30), as shown in FIG. 1 and FIG. 2. The platform 32 is above the maximum recommended litter level and has a means for draining loose litter back into the litter area, such as drainage holes 33. The platform 32 travels with the rake 25 to temporarily collect solid waste that accumulates thereupon to isolate the solid waste from the litter and prevent the solid waste from being pushed by the rake/litter interaction against the side wall 22 of the chamber 21.

During rotation within chamber 21, sleeve 37 shields a tunnel 44 (FIG. 2, FIG. 4 and FIG. 5), in the side wall 22 of the chamber, however sleeve 37 also comprises an opening 39, immediately adjacent to the rake platform 32 so that when the sleeve opening aligns with tunnel 44, the solid waste collected by the rake 25 is removed from the chamber 21. Means to remove the solid waste collected by the rake 25 from the chamber 21 may be provided, for example, which is not to be considered limiting in any manner, by a scoop 46 normally positioned in the tunnel 44 that enters the chamber when the sleeve opening 39 aligns with the tunnel and contacts the rake support arm 27. As the rake 25 moves through the litter, the rake support arm forces the scoop 46 to follow its curved shape. This causes the scoop 46 to pass over the platform 32 and to push the solid waste into tunnel 44. The scoop 46 is then pushed back into the tunnel 44 by the rake 25 to await the next alignment between the sleeve opening 39 and the tunnel. A waste receptacle (generally indicated as 49) may be used to collect the solid waste exiting tunnel 44. Tunnel floor 47 and ramp 53 deflect or push solid waste against a trapdoor 51 (FIG. 6 and FIG. 7a) covering an opening in the cover 50 of the waste receptacle. The lightweight trapdoor 51 is pushed open by the solid waste and closes by gravity to rest on the tilted frame 52 around the opening. The trapdoor 51 may also flex under its own weight to conform to distortions in the surface of the tilted frame 52 or to litter particles to reduce the escape of odors. The trapdoor may operate independently of the means to remove waste from the chamber 21.

Figures 7A, 7B:
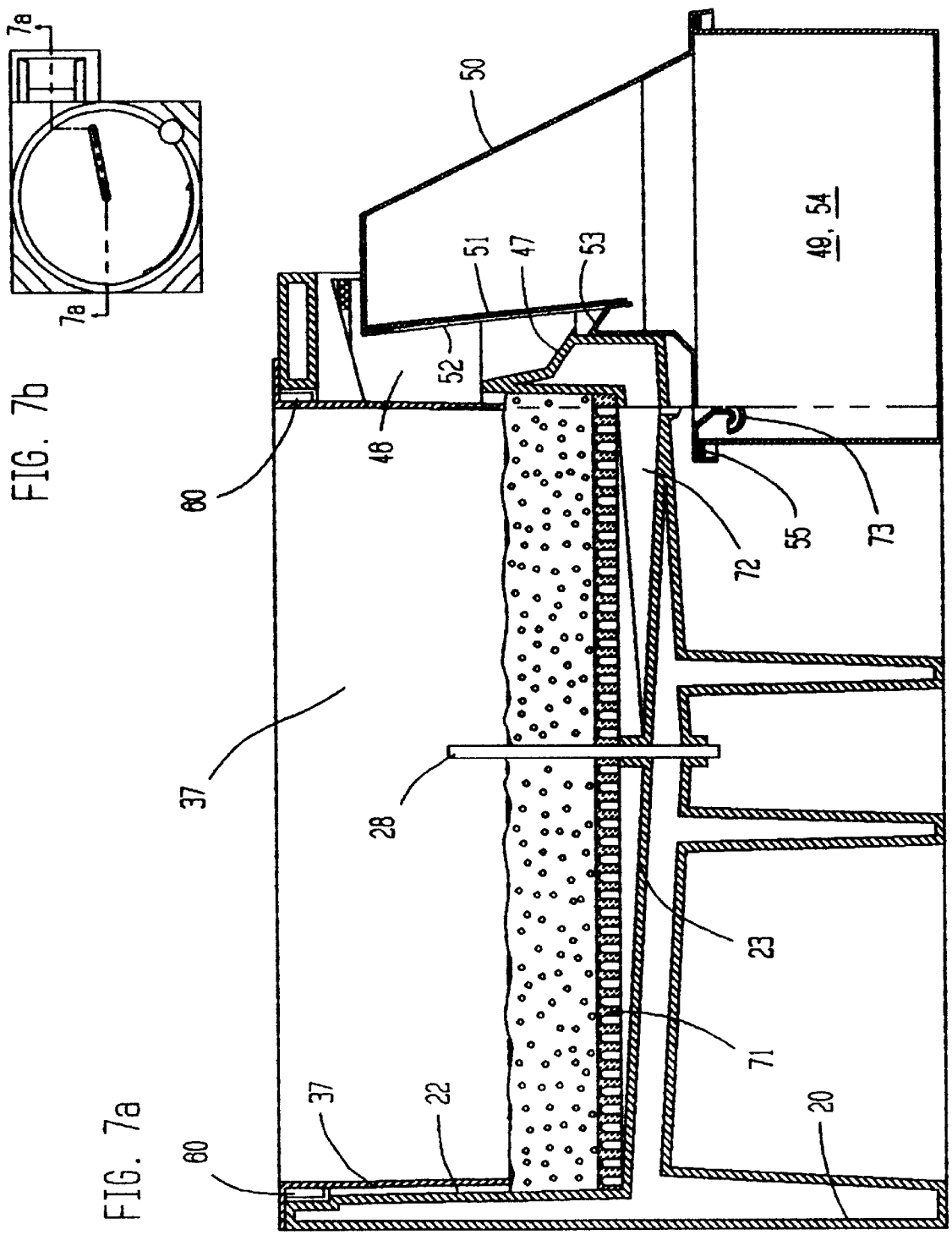

Another embodiment of the self-cleaning litter device of the present invention, shown in FIG. 7a, may be used with nonabsorbent litter. The litter is supported by a perforated member 71 that allows liquid waste to drip through onto the sloped bottom 23 of the chamber 21. A passage 72 then leads the liquid waste from approximately the central axis of the sloped bottom 23 to waste receptacle 49. Solid and liquid waste may be collected in the same waste receptacle 49, as shown in FIG. 7a, or separate compartments/waste receptacles may be used. A urine trap 73 may also be included to reduce odors.

Figure 8:
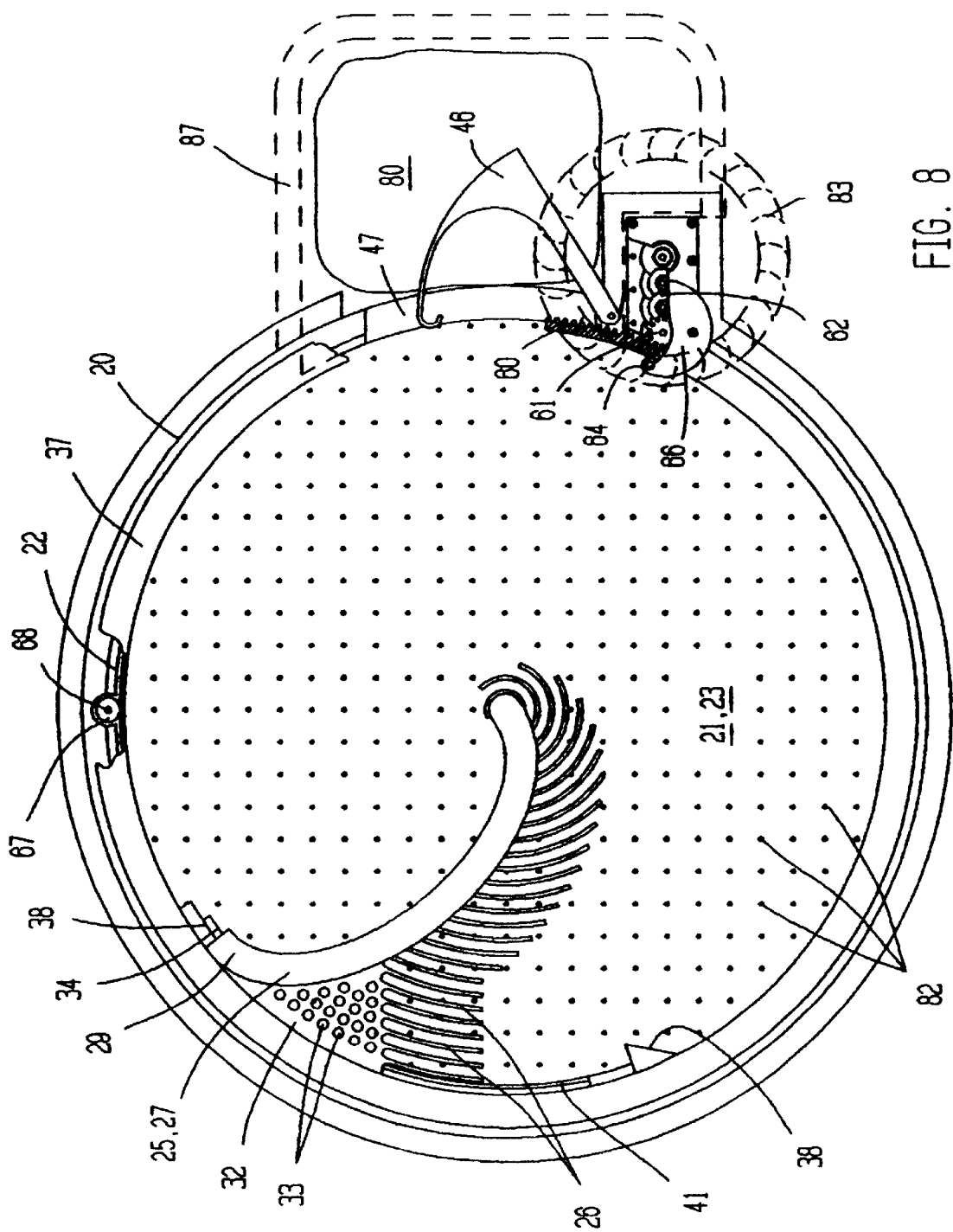
FIG. 8 is a plan view of an aspect of an embodiment of the present invention used outdoors showing a compost pit and a wind turbine.

With reference to FIG. 8, an outdoor embodiment of a self-leaning litter device is shown next to a compost pit 80. The compost pit 80 may be used instead of a waste receptacle. The outdoor self-cleaning litter device has a means to drain liquids from the chamber 21. The drive means for this embodiment may be a wind-powered turbine 83, however other drive means for example, but not limited to, a hand crank or a motor such as an electric geared motor, may be used as required.

A further embodiment is described wherein the sifting action between rake 25 and the litter is achieved by rotating chamber 21a (FIG. 9) and the litter material contained therein past the rake. In this embodiment, rake 25 and sleeve 37a remain stationary and tunnel 44 may remain continuously open. The rotating chamber embodiment may also be provided with a means to drain liquid waste for use with nonabsorbent litter.

Preferably a slow, continuously rotating rake 25 (FIG. 1) or rotating chamber 21a (FIG. 9) may be used to impart a rotational motion between the rake and the chamber to sift the litter material contained therein, however, faster rotation of the rake or chamber may also be performed. For operating the self-cleaning litter device at greater speeds, the device may be comprised of sensors and start/stop controls, for example a passive infrared motion sensor with a control, such as a switch, to activate/deactivate an electric drive means. Sensors and start/stop controls may be used to detect the presence of an animal within or near the litter device and control the device to produce, for example:

(1) a slow or fast sifting action that begins shortly after the animal leaves the self-cleaning litter device and terminates after a period of time or a number of revolutions;

(2) a slow sifting action started and stopped for selected times or durations; or, (3) a slow sifting action temporarily stopped while the animal is in the self-cleaning litter device.

In a preferred embodiment of the present invention, the self-cleaning litter device is comprised of an enclosure 20 containing a substantially circular chamber 21 with a side wall 22 and a bottom 23, as shown in FIG. 1 and FIG. 2. The chamber 21 supports a quantity of litter during use. The preferred litter material is clumping litter that reacts with liquid waste (urine) to form solidified clumps. The solidified clumps are then collected with other solid waste (such as feces), however, nonabsorbent litter may also be used as described in more detail below.

Solid waste is sifted or extracted from the litter by moving rake 25 through the litter or by moving the litter past the rake. This relative motion may be produced, for example, by rotating the rake 25 in a stationary chamber 21 (FIG. 1) or by rotating circular chamber 21*a* (and the litter contained therein) past a stationary rake 25 (FIG. 9). The rotational motion between the rake and the chamber may be continuous at a very slow speed such that, for example, which is not to be considered limiting in any manner, rake to litter and rake to chamber motion is less than 10 cm/min. However, faster speeds may also be used as required. Preferably, the rotational motion between the rake and the chamber is, for example, below 2 to 5 cm/min. A slow rotational motion is typically not noticed by an animal. The rotational motion may be intermittent or continuous as required. A slow rotational motion between the rake and the chamber allows continuous sifting to be performed even while an animal is in the device and results in continuous availability of the self-cleaning litter device to the animal. Slow, continuous rotational motion eliminates the need and associated cost of sensors and start/stop controls. These components are generally used to detect the presence of an animal, provide sufficient time after the animal leaves for clumping litter to solidify before activating the cleaning cycle, and prevent animal/cleaning cycle encounters. However, sensors and controls, for example a passive infrared motion sensor that can activate/deactivate the drive means (such as a switch for an electric drive means), or those disclosed in U.S. Pat. No. 5,048,465 and U.S. Pat. No. 5,622,140 may be fitted to the self-cleaning litter device of the present invention. A slower rotational motion also allows more time for the litter to redistribute itself around the tines of the rake and the solid waste. This results in less turbulence, less dust and less power to sift the litter. In addition, the rotational nature of the self-cleaning litter device allows litter disturbances in front or behind the rake to be eventually smoothed and solid waste to be extracted.

Figure 4:
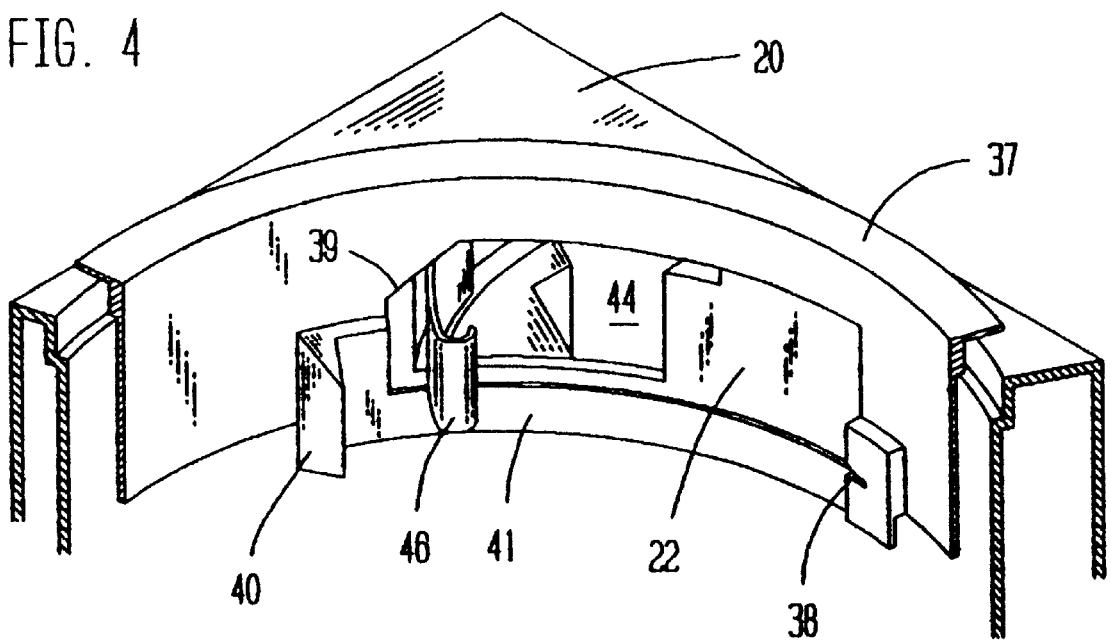
FIG. 4 is a perspective view of an aspect of the embodiment of the present invention shown in FIG. 1, showing the sleeve, its opening, the scoop and their interaction.
Figure 5:
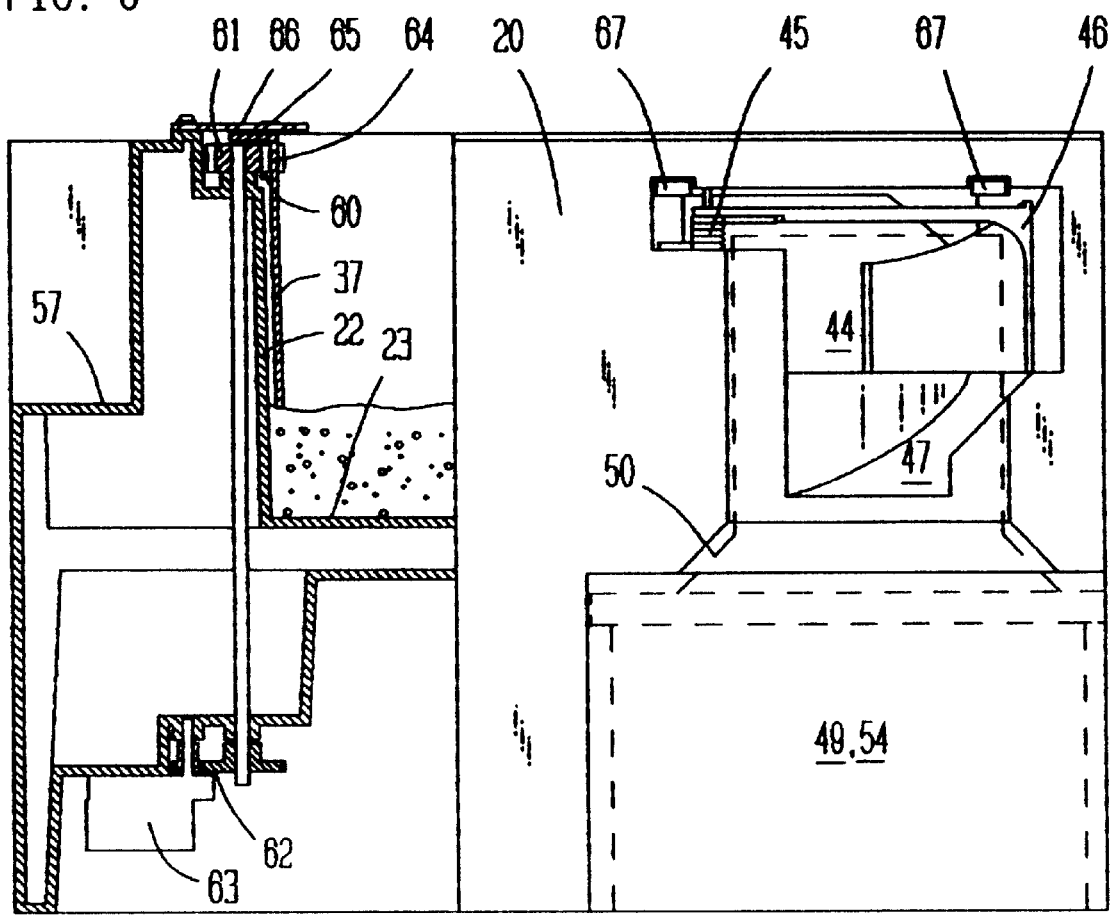
FIG. 5 is a sectioned, side elevation view of an aspect of the embodiment of the present invention shown in FIG. 2, showing a means for solid waste disposal and a means to rotate the sleeve.

The rake may be comprised of a support arm 27 which extends in a curved or spiral fashion from a post 28 located approximately along the central axis of the chamber 21 to an outer end 29 near the side wall 22 of the chamber (FIG. 2). Rotational motion between the rake and the chamber may be achieved by, for example, rotating the rake 25 within a stationary chamber 21 as shown in FIG. 1 and FIG. 2. Rotation of the rake 25 may be achieved, for example, by driving the rake from the post 28, or from the rake's outer end. 29. Driving the rake by its outer end 29 may be achieved, for example, which is not to be considered limiting, by a drive means which travels with the rake (as described in U.S. Pat. No. 4,067,297 and included by reference) but is preferably achieved by the pushing action of a rotating, substantially circular sleeve 37 on the outer end 29 of the rake as shown in FIG. 1 and FIG. 2. Means to rotate the sleeve 37 will be described later in greater detail. Sleeve 37 may fit over side wall 22 and into chamber 21, extending down from the top of the enclosure 20 generally to the recommended litter level, and immediately within the side wall of the chamber as shown in FIG. 4 and FIG. 5. The rake 25 may be attached to sleeve 37 through any suitable attachment means. For example, which is not to be considered limiting, a beam 41 (FIG. 1 and FIG. 4), connected to, or formed in, the sleeve 37, supports the outer end 29 of the rake and rake platform 32 (described later). The beam 41, in combination with post 28, supports the rake 25 at the proper height to prevent the tines 26 from scraping the bottom 23 of the chamber 21. A notch 38 in sleeve 37 may be provided to mate with an extension 34 of platform 32, as shown in FIG. 1, FIG. 2 and FIG. 4. This allows the sleeve 37 to push the rake 25, restrict its vertical movement and provide a simple means for removing the rake for cleaning.

Figure 3A:
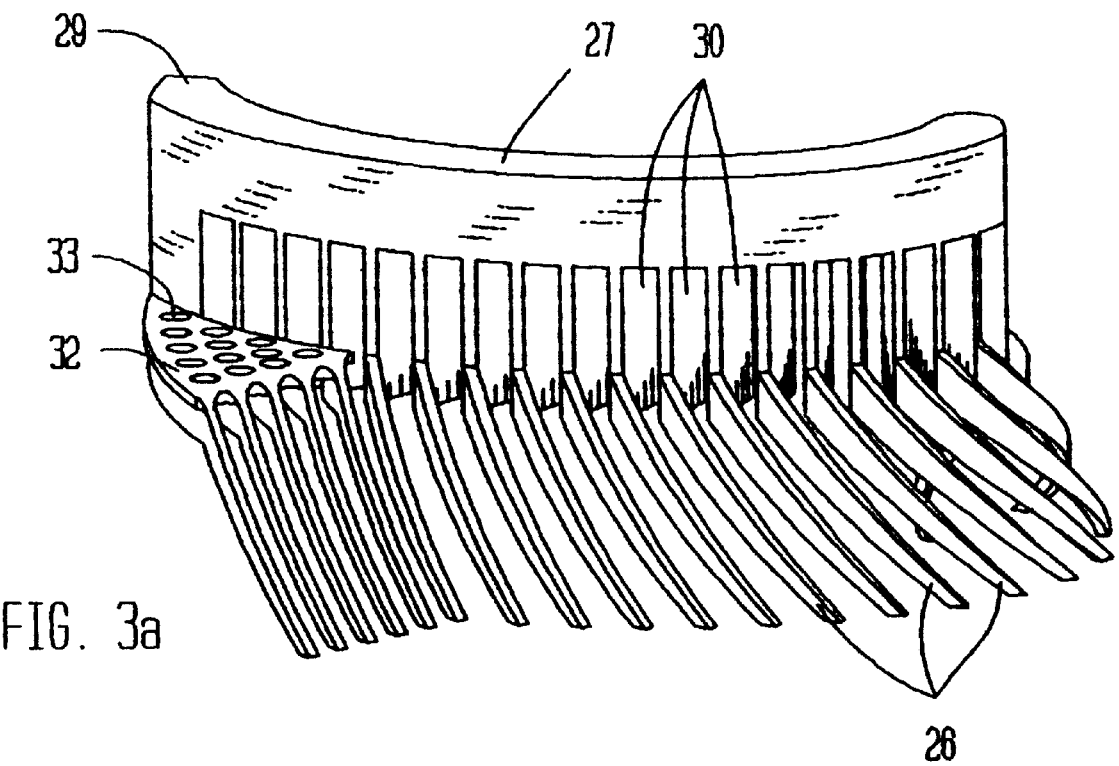
FIG. 3a is a perspective view of an aspect of an embodiment of the present invention showing a rake with deflectors and helically-shaped tines.
Figure 3B:
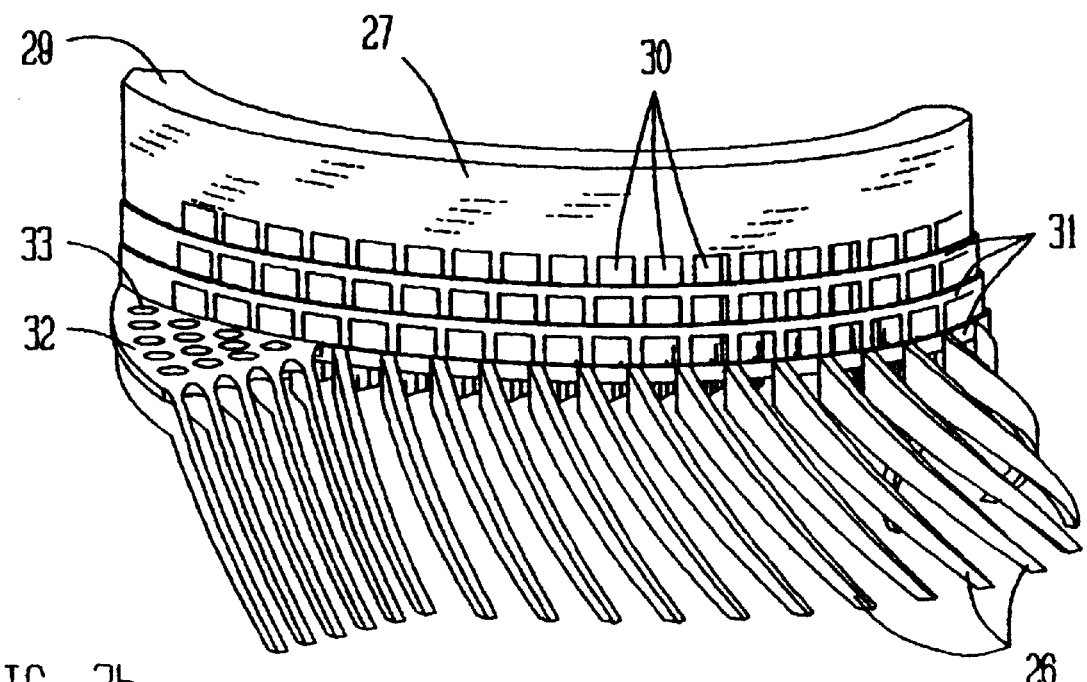
FIG. 3b is a perspective view of a similar aspect of the embodiment of the present invention shown in FIG. 3a with cross members added to the rake for added sifting ability.

Although the tines 26 may be of any suitable shape that can extract or sift solid waste from the litter, such as horizontal and/or vertical tines, the preferred tines 26 extend with generally downward slopes into the chamber 21 to deflect buried solid waste upwards. One or more tines 26 may also be curved, for example which is not to be considered limiting, with a radius of curvature about equal to each tine's radial distance from the central axis of the chamber resulting in a helically-curved shape, as shown in FIG. 3*a* and FIG. 3*b* (however tines with a different curvature may also be used). Thin tines helically-curved in this way travel narrow circular paths within the chamber that displace little litter resulting in a lower resistance to motion. Horizontal rake tines generally require greater forces to push through the litter since each horizontal tine must essentially displace all the litter above it. Tine spacing is selected according to the size of the solid waste to be sifted from the litter.

The rake 25 may also be comprised of one or more deflectors 30 to redistribute litter and/or litter disturbances. The deflectors, for example, may be integral with the tines or independently connected to the rake support arm 27. The leading edge of the deflectors 30 may also assist in deflecting solid waste outwards. The deflectors 30 shown in FIG. 2, FIG 3*a* and FIG. 3*b* are used to redistribute accumulations of surface litter due to animal activity and/or rake/tine sifting action and link the tines 26 to the rake support arm 27. The deflectors 30 extend down to a level near the recommended litter level to redistribute any litter accumulations within their reach. The deflectors 30 may also be linked by cross members 31, as shown in FIG. 3*b*. The cross-members 31 further help in sifting the litter and in directing solid waste outwards.

The curved nature of the rake support arm 27 (and cross members 31) and the distribution of tines 26 (and the leading edges of deflectors 30) along the rake 25 may be used in combination with the litter to push solid waste, generally on the surface of the litter, outwards towards the side wall 22 of the chamber 21. If left unaltered at the outer end 29 of the rake, this construction could also push solid waste outwards against the side wall 22 of the chamber 21 through sleeve opening 39 (described later). This could cause the solid waste to smear against the side wall 22 or jam between the side wall 22 and the outer end 29 of the rake 25. Several means to prevent this may be used, for example, one or more tines nearest the outer end 29 of the rake 25 may be positioned in advance of adjacent inner tines to alter the general distribution of tines along the rake so that contact between solid waste and the tines nearest the outer end of the rake does not direct solid waste outwards. A platform 32 may also be incorporated at the outer end 29 of the rake 25, preferably between the advanced tines and the rake support arm/cross members (27 and 31), as shown in FIG. 1, FIG. 2, and FIG. 3*b*. The platform 32 is above the maximum recommended litter level and has a means for draining loose litter back into the litter area, such as drainage holes 33. Solid waste pushed outwards by the interaction of the litter and the rake support arm/cross members (27, and 31) or pushed upwards by the tines 26 connected to platform 32 is pushed onto the platform and becomes isolated from the litter. Once isolated from the litter, the solid waste stops moving towards the side wall 22 of the chamber 21 and remains on the platform until disposed of. The size of the platform 32 is selected to easily support the solid waste without causing the solid waste to contact the side wall 22 of the chamber 21.

The rake 25 including its support arm 27, tines 26, deflectors 30, cross members 31 and platform 32 may be made of any suitable resilient material for example but not limited to polymers, such as plastic, non-rusting metals for example stainless steel, treated metals, or a combination thereof. The present design permits the rake 25 to be made in one piece using an injection-molded thermoplastic, however, the rake may also be made of several components and attached together.

Immediately adjacent to the platform 32, the outer end 29 of the rake 25 and the beam 41 is an opening 39 in sleeve 37. Sleeve opening 39 faces the side wall 22 of the chamber 21. Once every revolution, sleeve opening 39 aligns with a tunnel 44 located in the side wall 22 of the chamber 21, as shown in FIG. 2 and FIG. 4. When this occurs, the solid waste is removed from platform 32 and the chamber 21. For example, a scoop 46, normally positioned in the tunnel 44, may enter the chamber 21 (due to biasing means 45, such as a spring, FIG. 2 and FIG. 5) to contact the rake support arm 27 (or cross members 31). As rake 25 rotates, scoop 46 is forced to follow the curved shape of the rake support arm 27 causing it to pass over the platform 32, deflecting any solid waste into tunnel 44, before it is itself forced back into the tunnel by the rake. The tunnel floor 47 may be tilted to cause the solid waste to roll/slide out of the tunnel and into waste receptacle 49. Scoop 46 then remains in the tunnel 44 until the sleeve opening 39 returns. Shielding of tunnel 44 by sleeve 37 prevents possible loss of loose litter during animal activity. A sleeve deflector 40 may also be fitted near the leading edge of the sleeve opening 39 to deflect large litter mounds, created by animal activity, away from the sleeve opening and reduce loss of litter into tunnel 44. The speed of entry of scoop 46 is controlled by the rotational motion of sleeve 37 and the interaction between the angled top edge of the scoop 46 and the leading top edge of the sleeve opening 39, as shown in FIG. 4 and FIG. 5. The described means to remove solid waste collected by rake 25 from the chamber 21 does not reduce the area available to the animal, when not in use. However other means to remove solid waste collected by the rake from the chamber may also be used.

Figure 6:
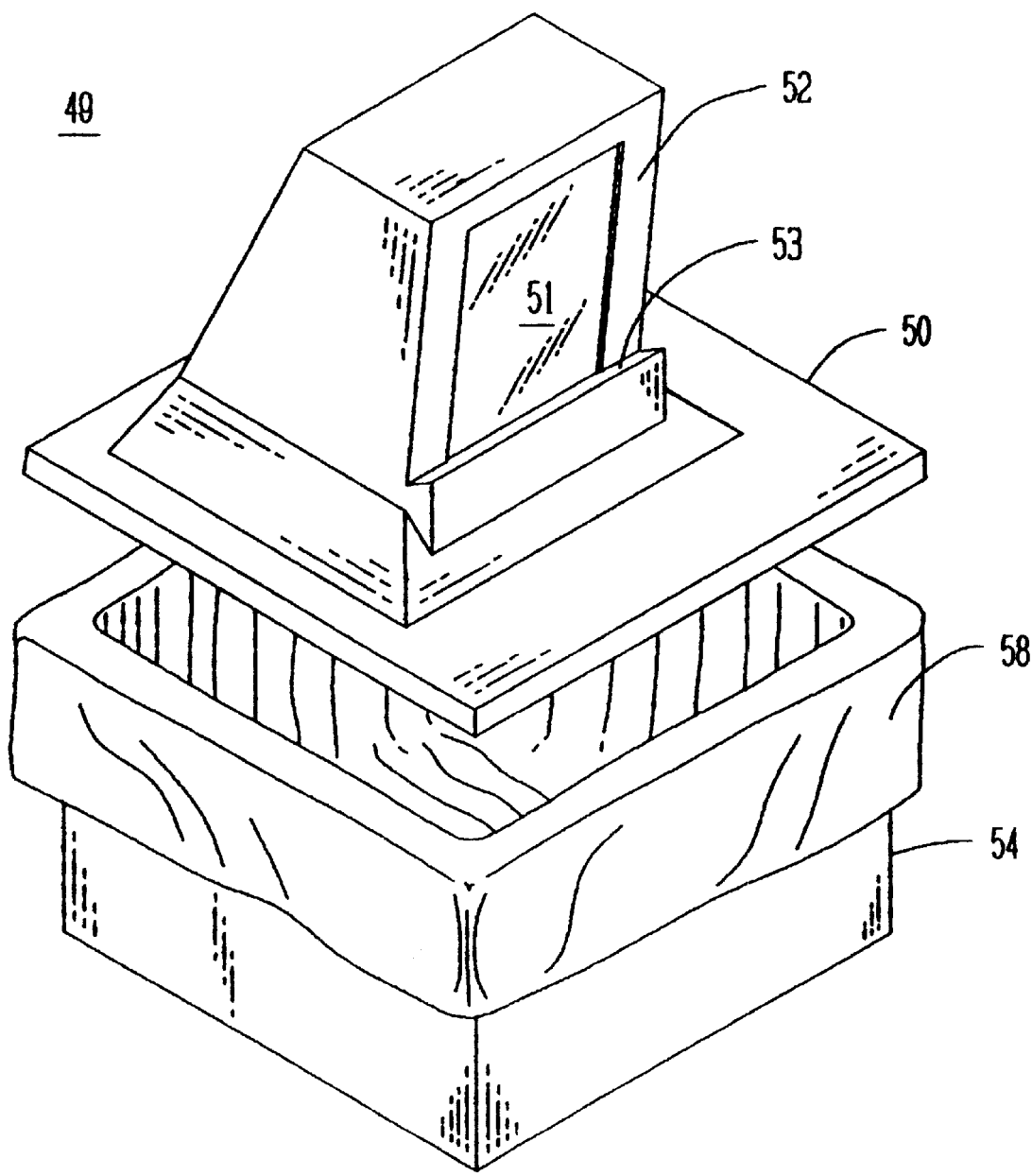
FIG. 6 is a perspective view of an aspect of an embodiment of the present invention showing a waste receptacle with the trapdoor closed.

FIG. 6 shows an example of a waste receptacle (generally indicated as 49) comprising a container 54, a cover 50 with an opening and a means to reduce the escape of odors from the opening using a trapdoor 51. The tunnel floor 47 and ramp 53 may be inclined to direct or push solid waste against the trapdoor 51 (FIG. 7a) to assist the solid waste in pushing the trapdoor open. A frame 52 may be provided around the opening in the cover 50. When closed, the perimeter of the trapdoor 51 may rest on frame 52 to produce a seal around the opening to reduce the escape of odors. Frame 52 is tilted slightly from vertical so that gravity causes the trapdoor 51 to close against it. The trapdoor 51 remains closed until pushed open by discarded solid waste and only opens enough to allow the solid waste to pass. The trapdoor 51 closes immediately after the solid waste has entered and may operate independently of the means to extract solid waste from the litter chamber.

The trapdoor 51 is sufficiently light in weight to be responsive to typical solid waste rolling down the tunnel floor 47 and ramp 53. Using very thin metals or plastics for the trapdoor however can make the trapdoor fragile and can often result in non-flat surfaces due to manufacturing tolerances, internal stresses in the material, handling damage, etc. Similarly, any distortions in frame 52 or the presence of small particles of litter can leave gaps between the frame and the trapdoor that can allow odors to escape. For example, flatness tolerances for typical thermoplastic materials can sometimes exceed 0.01 cm/cm. To accommodate these factors, the preferred trapdoor 51 is elastic, to retain its original shape following slight bending during manufacturing, handling, etc.; and uses its weight (even though light and at a slight tilt from vertical) to flex to conform to small distortions in the flatness of frame 52, to compensate for small distortions in the flatness of the trapdoor itself and to conform to small fragments of litter which, at times, may become trapped between the frame and the trapdoor. This conforming ability serves to reduce any gaps between the frame 52 and the trapdoor 51 to reduce the escape of odors. In addition, the trapdoor should not be so thin as to be fragile and easily damaged. To accomplish this, the preferred trapdoor has a low stiffness to weight ratio. Since stiffness may be expressed as the product of the stress/strain modulus and the second moment of area, a suitable thickness for the trapdoor may be selected using a very flexible material. For example, which is not to be considered limiting, a thin sheet of polychloroprene with a modulus of approximately 2 MPa (at 100% elongation) and 0.25 mm. thick was found to be acceptable. The thickness of trapdoor 51 shown in FIG. 7a has been exaggerated for illustrative purposes. The top of the trapdoor 51 may be bonded to frame 52 so that the trapdoor flexes to allow the solid waste to enter or the top of the trapdoor may be attached to a pivoting hinge, for example, a fatigue-resistant tape.

A disposable plastic bag or liner 58 (FIG. 6) may be placed within container 54 of the waste receptacle 49 to provide a clean and effective way to collect and dispose of the solid waste. A gasket 55 (FIG. 7a) may be used between the cover 50 and the container 54. FIG. 5 shows how the cover 50 of waste receptacle 49 may be contoured to fit against the tunnel 44 and tunnel floor 47 from outside the device. Waste receptacle 49 may also fit partially under the device to increase its capacity. To accommodate a larger waste receptacle, the chamber 21 may be elevated.

Steps 57 (FIG 1, FIG. 2 and FIG. 5), may be contoured into three of the corners of the enclosure 20 to assist animals to enter and exit the device.

Although rotation of the rake 25 within the chamber 21 may be provided by a variety of means including driving the rake from the post 28 located approximately along the central axis of the circular chamber, supplying the force to rotate the rake at the furthest distance from the center of rotation (near the outer end 29 of the rake and the side wall 22 of the chamber 21) results in the lowest force required. A lower force reduces the demands on the means to produce the rotational motion. Means to rotate the rake 25 from its outer end 29 may be provided, for example which is not to be considered limiting, by using a drive means that travels with the rake and acts on a traction means along the side wall of the chamber similar to that described in U.S. Pat. No. 4,067,297 (which is incorporated by reference) but is preferably provided by rotating sleeve 37 which pushes the outer end 29 of the rake 25 as shown in FIG. 1 and FIG. 2. Sleeve 37, in turn may be urged to rotate by, for example, a stationary drive means acting on a traction means on the sleeve's outer surface. The preferred traction means comprises gear teeth along the outer surface of sleeve 37, producing a large sleeve gear 60 which interacts with a pinion 61. However, other traction means may be used, for example a belt or chain drive; or capstan rotor in driving association with sleeve 37. The drive means may be comprised of any suitable motor, for example but not limited to an electric geared motor 63 as shown in FIG. 2, a wind turbine 83 as shown in FIG. 8 or a hand crank (not shown). A gear train 62 (FIG. 2, FIG. 5, FIG. 8 and FIG. 9) may also be used to transmit the drive from the drive means to sleeve 37 with the torque requirements. In addition, a torque limiter such as a slip clutch (not shown), may be incorporated to prevent excessive forces from potentially damaging the device.

Unlike a typical spur gear, sleeve gear 60 and sleeve 37 may not be rigid or rigidly connected at its center of rotation. This may cause the sleeve 37 to deflect onto the side wall 22 of chamber 21 as a result of the driving force produced by pinion 61 and the resisting force of the rake 25. Contact with the side wall of the chamber produces the reaction forces (normally provided by the central axle of a typical spur gear) to assist in the rotation of sleeve 37. One or more idler rollers 67 (FIG. 2) may be used along the side wall 22 of the chamber 21 to provide: a rolling contact for sleeve 37; a distance between the sleeve and the side wall of the chamber; and the reaction forces to assist in the rotation of the sleeve. Each idler roller 67 rotates on an axle 68 that may be fixed to the side wall 22 of the chamber 21. Sleeve gear 60 and pinion 61 are located near the top of the enclosure 20, typically above sleeve opening 39, and are shielded from animal activity by the sleeve. A restraining means is used to keep the sleeve gear 60 and the pinion 61 meshed. The preferred restraining means is a counteracting roller 64 that pushes outward against the inside surface of the sleeve 37 with its axle 65 fixed to the enclosure 20 by plate 66.

Another embodiment of the self-cleaning litter device of the present invention may use nonabsorbent litter, for example but not limited to recycled polyethylene or polypropylene plastic pellets. Nonabsorbent litter is not discarded with liquid waste (urine) resulting in a lower volume of litter being required over the long term. To optimize the use of nonabsorbent litter, the embodiment of the self-cleaning litter device is provided with a means for draining liquid waste from the chamber 21. For example, a perforated member 71 (FIG. 7a) may be fitted above a sloped bottom 23 of the chamber 21 to support the litter but allow the liquid waste to drain through. A passage 72, such as a trench, leads the liquid waste (urine) from approximately the central axis of the sloped bottom 23 of the chamber 21 to waste receptacle 49. Solid and liquid waste may be collected in the same waste receptacle 49, as shown, or separate waste receptacles or separate compartments within a waste receptacle may be used. A urine trap 73 may also be incorporated in the cover 50 of the waste receptacle 49 to reduce the escape of odors.

An outdoor embodiment of the present invention may be used next to a compost pit 80, as shown in FIG. 8. Rake operation is similar to the embodiments described above, however, the solid waste may be discarded into compost pit 80 instead of a waste receptacle. Typically, nonabsorbent litter material such as plastic pellets or sand may be used for outdoor applications. The bottom 23 of the chamber 21 is preferably flat with a plurality of holes 82 to provide a means for draining liquids from the chamber 21. A removable cover 87 may be used to cover the compost pit 80 and the scoop 46.

The drive means for the outdoor embodiment may be comprised of, for example, a motor such as an electric geared motor or a hand crank. Alternatively, the outdoor embodiment may be comprised of a wind-powered drive means, for example, a lightweight, vertical-axis, wind-powered turbine 83 (such as a Savonius turbine, a cup anemometer-type turbine or a common, lightweight centrifugal fan blower wheel used as a wind turbine). Wind turbine 83 is mounted on a vertical axle and spins when encountering winds from any horizontal direction. A gear train 62 may be used to reduce the typical wind turbine 83 speed to a more appropriate rake rotation speed. The torque produced by the wind turbine 83 may also be magnified by gear train 62 so that a relatively small, lightweight wind turbine 83 is sufficient to power a typical outdoor self-cleaning litter device. A simple torque limiter, such as a slip clutch (not shown), may be incorporated within the drive system to protect the device when large resistive forces are encountered. Although wind speeds may be inconsistent, contributions by winds above a low level are additive and contribute to rake movement and the eventual disposal of the solid waste. The outdoor embodiment may be independent of electrical power; easily installed, maintained and relocated; and healthier for the environment.

Another embodiment of the present invention is shown in FIG. 9 and FIG. 10. In this embodiment, the means to produce the rotational motion between rake 25 and chamber 21a uses a stationary rake 25 and sleeve 37a; and rotates circular chamber 21a. The resulting relative motion between the litter/chamber and the rake is similar to the embodiments described previously. The chamber 21a may be supported by a low friction turntable, for example a "Lazy Susan" assembly, shown in FIG. 10 as ball bearing 90. Gear teeth around the outer surface of the side wall 22a of chamber 21a, produce a large gear 91 which is operatively associated with the drive means to cause rotating motion, however, other traction means may also be employed. Idler rollers may be distributed between the stationary sleeve 37a and the side wall 22a of the chamber 21a to provide reaction forces to assist in the rotation of the chamber, however, the reaction forces may be provided, for example, by a turntable 90 that restricts radial movement as shown in FIG. 10. The drive system shown in FIG. 9 comprises a drive means, for example a motor such as an electric geared motor 63, a gear train 62 and pinion 61 that interacts with the large gear 91 around the outer surface of the side wall 22a of the chamber 21a. A restraining means is used, similar to the previous embodiments, to keep the large gear 91 of the chamber 21a and the pinion 61 meshed and may be comprised of, for example, a counteracting roller 64 that pushes outward against the inside surface of the side wall 22a of the chamber with its axle 65 fixed to enclosure 20a.

The stationary sleeve 37a overlaps the side wall 22a of the chamber 21a to prevent litter from falling out (FIG. 10). The tines 26 are similar to those previously described, and may extend with generally downward slopes into the chamber 21a to deflect buried solid waste upwards. Means to prevent the rake from pushing the solid waste against the side wall of the chamber may be provided, for example, by one or more tines nearest the outer end 29 of the rake 25 positioned in advance of adjacent inner tines to alter the general distribution of tines along the rake so that contact between the solid waste and the tines nearest the outer end of the rake does not direct solid waste outwards. A small platform 32 may also be used and may be provided with a means for draining loose litter back into the litter area such as, for example, one or more drainage holes 33. The platform 32 and the outer end 29 of the rake are mounted next to sleeve opening 39*a* and tunnel 44 so that solid waste pushed outwards by the rake support arm/cross members (27, 31) or pushed upwards by the tines nearest the outer end of the rake and platform 32 is pushed onto the platform and enters the sleeve opening 39*a* and the tunnel 44. Platform 32 may be smaller than typical solid wastes so that the solid waste immediately enters the sleeve opening 39*a* and the tunnel 44. The side wall 22*a* of the chamber 21*a* passes under the tunnel floor 47. Since the sleeve 37*a* is stationary in this embodiment, it may be made integral with the enclosure 20*a* and the tunnel 44. The sleeve opening 39*a* and tunnel 44 are always in alignment allowing solid waste to be discarded at any time. Loss of loose litter into the tunnel 44 by animal activity is low since access to the front of the tunnel 44 is limited by the curvature of the stationary rake 25 and the sleeve deflector 40*a*.

FIG. 11 shows a further aspect of an embodiment of the present invention wherein a self-cleaning litter device with a rotating chamber 21*a* is provided with a means to drain liquid waste from the chamber for use with nonabsorbent litter. For example, a perforated member 71 may be fitted above the sloped bottom 23*a* of the rotating chamber 21*a* to support the litter but allow the liquid waste to drain through. A passage 72*a*, such as a tube, leads the liquid waste (urine) drained from the sloped bottom 23*a* of the chamber 21*a* to the waste receptacle 49.

Although the described embodiments of the present invention preferably use a slow, continuous rotational motion between the rake and the chamber with a relative speed, for example which is not to be construed as limiting, less than 10 cm/min, and preferably less than 2 to 5 cm/min, the devices may be operated at greater speeds. For operation at greater speeds, the self-cleaning litter device may be comprised of sensors and start/stop controls, for example a passive infrared motion sensor to activate/deactivate the drive means or sensors and controls such as those disclosed in U.S. Pat. No. 5,048,465 or U.S. Pat. No. 5,622,140. Sensors and start/stop controls may be used to: detect the presence of an animal within or near the litter device; control the drive system to prevent animal/cleaning cycle encounters; and provide sufficient time after the animal leaves to allow the clumping litter to solidify before the cleaning cycle is activated. Sensors and/or start/stop controls may also be used to produce, for example:

(1) a slow or fast sifting action that begins shortly after the animal leaves the self-cleaning litter device and terminates after a period of time or a number of revolutions; or, (2) a slow sifting action started and stopped for selected times and durations by a timer; or (3) a slow sifting action temporarily stopped while the animal is in the self-cleaning litter device.

Additionally, the drive means may be comprised of a hand crank for intermittent manual operation.

The present invention has been described with regard to preferred embodiments. However, the present invention is not limited to these embodiments, features or combination of features but includes all the variations, modifications, features and combinations of features within the scope of the appended claims.

The embodiments of the invention in which an exclusive property or privilege is claimed are defined as follows:

1. A self-cleaning litter device that extracts solid waste from a litter material contained therein during use, comprising:

a substantially circular chamber bounded by a side wall;

a rake, said rake comprised of a means to deflect solid waste out of the litter material and outwards toward said side wall of said circular chamber, said rake comprised of a plurality of tines, said tines extending with generally downward slopes into said chamber to deflect said solid waste upwards, and at least one of said tines is helically-shaped with a radius of curvature about equal to said tine's radial distance from said central axis of said chamber;

a means to produce a rotational motion between said rake and said chamber;

a means to prevent said rake from pushing said solid waste against said side wall of said chamber; and a means to remove said solid waste collected by said rake from said chamber.

2. A self-cleaning litter device that extracts solid waste from a litter material contained therein during use, comprising:

a substantially circular chamber bounded by a side wall;

a rake, said rake comprised of a means to deflect solid waste out of said litter material and outwards toward said side wall of said circular chamber, and extends from a central axis of said chamber to an outer end near said side wall of said chamber and comprises a plurality of tines;

a means to produce a rotational motion between said rake and said chamber;

a means to prevent said rake from pushing said solid waste against said side wall of said chamber comprising an altered distribution of said tines near said outer end of said rake such that contact between said solid waste and said tines near said outer end of said rake does not direct solid waste outwards; and a means to remove said solid waste collected by said rake from said chamber.

3. The self-cleaning litter device of claim 2, wherein said rake further comprises a platform near said outer end.

4. A self-cleaning litter device that extracts solid waste from a litter material contained therein during use, comprising:

a substantially circular chamber bounded by a side wall;

a rake, said rake comprised of a means to deflect solid waste out of the litter material and outwards toward said side wall of said circular chamber, wherein said rake extends from a central axis of said chamber to an outer end near said side wall of said chamber and comprises a plurality of tines;

a means to produce a rotational motion between said rake and said chamber comprising a stationary chamber, a substantially circular sleeve near said side wall of said chamber and attached to said outer end of said rake, and a drive means operatively associated with said sleeve to produce a rotational motion of said sleeve and to force said rake to rotate;

a means to prevent said rake from pushing said solid waste against said side wall of said chamber; and a means to remove said solid waste collected by said rake from said chamber.

5. The self-cleaning litter device of claim 4, wherein said drive means is selected from a group consisting of a motor, a wind turbine and a hand crank.

6. The self-cleaning litter device of claim 4, wherein said means to remove said solid waste collected by said rake from said chamber comprises:

a tunnel in said side wall of said chamber;

said sleeve having an opening immediately adjacent said outer end of said rake;

wherein, when said opening in said sleeve aligns with said tunnel, said solid waste collected by said rake is removed from said chamber.

7. The self-cleaning litter device of claim 6, further comprising:

a scoop located in said tunnel which can enter said chamber; and a biasing means to urge said scoop into said chamber;

wherein, when said opening in said sleeve aligns with said tunnel, said scoop enters said chamber, said scoop pushing said solid waste into said tunnel before being pushed back into said tunnel by said rake.

8. The self-cleaning litter device of claim 4, further comprising a means to drain liquid waste from said chamber.

9. A self-cleaning litter device that extracts solid waste from a litter material contained therein during use, comprising:

a substantially circular chamber bounded by a side wall;

a rake, said rake comprised of a means to deflect solid waste out of the litter material and outwards toward said side wall of said circular chamber;

a means to produce a rotational motion between said rake and said chamber;

a means to prevent said take from pushing said solid waste against said side wall of said chamber;

a means to remove said solid waste collected by said rake from said chamber comprising a waste receptacle comprised of a container, a cover that fits over said container and having a tilted frame around an opening, and a trapdoor covering said opening that is sufficiently light in weight to be pushed open by said solid waste and closed by gravity to rest on said tilted frame.

10. The waste receptacle of claim 9, wherein said trapdoor can flex under its own weight to conform to the surface of said tilted frame to reduce the escape of odors.

11. The waste receptacle of claim 9, further comprising a ramp in front of said trapdoor to assist said solid waste in pushing said trapdoor open.

12. A waste receptacle for use with a self-cleaning sanitary device to collect solid waste comprising, a container;

a cover that fits over said container and further comprises;

a tilted frame around an opening; and a trapdoor covering said opening that is sufficiently light in weight to be pushed open by said solid waste and closed by gravity to rest on said tilted frame.

13. The waste receptacle of claim 12, wherein said trapdoor can flex under its own weight to conform to the surface of said tilted frame to reduce the escape of odors.

14. The waste receptacle of claim 12, further comprising a ramp in front of said trapdoor to assist said solid waste in pushing said trapdoor open.

15. A rake to extract solid waste from a circular chamber within a self-cleaning litter device comprising, a plurality of tines that extend with generally downward slopes into said circular chamber and wherein at least one tine is helically-shaped with a radius of curvature about equal to said tine's radial distance from a central axis of said circular chamber.

16. The rake of claim 15, further comprising at least one deflector.

* * * * *